Dec. 31, 1968   J. K. STRATTON   3,418,752
REMOVABLE COVERING

Filed Feb. 24, 1966

INVENTOR.
John K. Stratton

INVENTOR.
John K. Stratton

United States Patent Office 3,418,752
Patented Dec. 31, 1968

3,418,752
REMOVABLE COVERING
John K. Stratton, 1130 Standiford Ave.,
Louisville, Ky. 40213
Filed Feb. 24, 1966, Ser. No. 529,796
7 Claims. (Cl. 47—28)

ABSTRACT OF THE DISCLOSURE

This invention describes a plant shading device which is adapted to automatically exclude light from all or any part of a planted area.

The present invention relates to apparatus for shading or covering growing plants, and more particularly, relates to apparatus for selectively covering and uncovering areas of growing plants.

In growing certain plants it is necessary to provide removable covering or shading over the plants to obtain certain desired results. For example, the rate of development of certain plants can be controlled by carefully regulating exposure of the plants to light, either natural or artificial. In growing such plants, the growing period, and therefore the harvesting time, can be predictably controlled by regulating exposure of the plants to light. By properly controlling exposure of different portions of a crop to light it is possible to plan for a continuous supply of matured plants or for selected portions of a crop to mature at a desired time. To control the rate of development in such a desired manner, it is necessary to provide artificial light during the shorter days of the year, and in the longer days of the year it is necessary to systemically exclude light from the plants during a portion of each day, for example, by covering the growing plants. An apparatus for thus excluding light must be efficient because such plants are affected by even the slightest light exposure.

Previously, light has been excluded from such areas of growing plants for a portion of each day by manually covering individual beds or other small areas with specifically adapted covering cloths. Such previous methods have been tedious, laborious, expensive, and time consuming. Furthermore, such previous methods have been inconvenient because it is necessary to cover the areas of growing plants at unusual hours of the day when labor is not usually available. For example, in many instances, it is desirable to provide twelve hours of light and twelve hours of darkness over the areas of growing plants, and since the normal working day is only eight hours, it is necessary to recall workers at other than their normal working hours to cover and uncover the plants.

Moreover, in using such previous apparatus, where individual small areas are successively covered and uncovered day after day, accumulated day to day differences in time consumed in covering and uncovering such different areas are compounded and adversely affect the planned growing periods and time of maturation of such different areas of plants.

In other situations, it is desirable to cover selected areas of growing plants to prevent damage to the plants, for example from frost.

In accordance with the present invention, a new and efficient apparatus is provided for covering, for example, to preclude light and other undesirable elements from selected areas of growing plants. The advantageous apparatus in accordance with the present invention can be operated automatically and can be adapted to provide controlled covering and uncovering for an area of growing plants of any size or shape. Furthermore, the straightforward and inexpensive apparatus in accordance with the present invention essentially eliminates all of the manual labor formerly required to cover growing plants to provide protection and preclude light.

Moreover, the efficient apparatus of the present invention provides means to cover an area of any size at a uniform rate of covering during repeated daily coverings where the total time required to cover an area of any size is very short so there is no accumulated day-to-day difference in time consumed in covering different areas and the areas are always covered in the same order. Furthermore, the advantageous apparatus of the present invention can be operated at any time of day without recalling workers.

Various other features of the present invention will become obvious to those skilled in the art upon reading the disclosure set forth hereinafter.

More particularly, the present invention provides an apparatus for controlling the covering and uncovering of an area of growing plants comprising: cover support means extending in spaced relation above the area to be covered from a first end of the area to a second end generally opposite the first end; a flexible sheet-like cover slidably supported on the cover support means; cover attaching means attaching a first edge of the cover over the first end of the area to be covered; stiff rod-like leading edge means attached to a second edge of the cover generally opposite the first edge, the leading edge being slidably supported on the cover support means to substantially traverse the length of the area to be covered on the cover support means and spread the cover over, and retract the cover from, the area to be covered in response to successive back and forth traverses of the leading edge over the area to be covered; and means connected to the leading edge to move the leading edge back and forth over the length of the area to be covered to correspondingly spread and retract the cover.

The sheet-like cover of the present invention can be of a light impervious material to exclude light and end and side curtains can be provided to extend downward from the periphery of the cover to prevent admission of light from the ends and sides of the area to be covered. It is to be understood that the cover can be of a material to filter out certain selected undesired rays of light.

It is to be understood that within the scope of the present invention, various changes can be made in the arrangement, form, and construction of the apparatus disclosed herein.

Referring now to the drawings which disclose one advantageous embodiment of the present invention:

Figure 1:
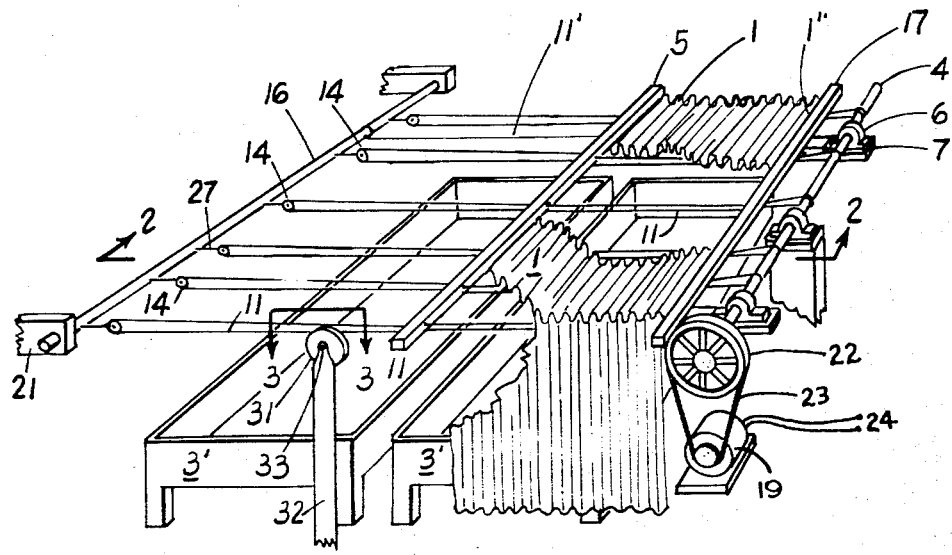
FIGURE 1 is an isometric view, partly in section, of an apparatus in accordance with the present invention for covering two sides and the top of an area of growing plants.

FIGURE 1, in general, shows an example of an apparatus in accordance with the present invention to provide a cover over area 3 and exclude light from the top and sides of the area 3 which can include any number of beds 3′ of growing plants. The apparatus of the example of FIGURE 1 includes a flexible, light impervious, sheet-like cover 1 which, advantageously, has the same peripheral configuration as area 3. A stiff leading edge 5 is attached to one edge of cover 1, and cover 1 and leading edge 5 are supported generally horizontally in spaced relation over area 3 on traveling cables 11 and fixed cables 11′. Within the scope of the present invention, any suitable curtain means can be provided for the sides of area 3, and if desired, curtains can be provided to exclude preselected wavelengths of light from the sides and ends of area 3. In the example of FIGURE 1, light impervious side curtains 2 depend from the sides of cover 1 to prevent armission of light to area 3 from the sides.

Figure 2:
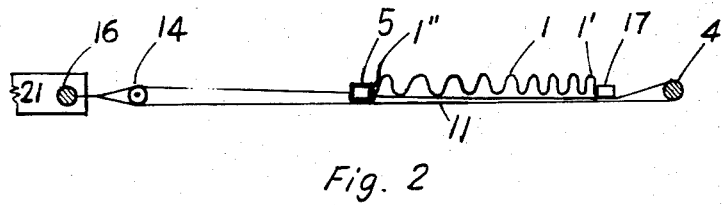
FIGURE 2 is a view taken along a plane passing through line 2—2 of FIGURE 1.

In accordance with the example of the present invention as shown in FIGURES 1 and 2, stiff leading edge 5 is attached to edge 1′ of cover 1 and extends substantially the width of cover 1 across area 3. Within the scope of the present invention, leading edge 5 can be, for example, a light metallic tubular rod. Leading edge 5, advantageously, slides freely on a portion of traveling cables 11 as hereinafter described and on fixed cables 11′ in traversing the length of area 3, as hereinafter described to uniformly spread cover 1 over area 3 as leading edge 5 passes in one direction over area 3 and remove cover 1 from area 3 as leading edge 5 traverses the length of area 3 in the other direction.

Edge 1″, the edge of cover 1 generally opposite edge 1′, is attached to support 17 which is disposed in spaced relation over the end of area 3 above and adjacent cables 11 and 11′ and is held by supports 7 which can be fixed, for example, to an adjacent structure or otherwise supported. In the example of FIGURE 1, supports 17, which can be for example a rod, extends the width of area 3 and provides a convenient means to stop cover 1 as it is withdrawn from area 3 and to hold edge 1″ as desired over the end of area 3 when cover 1 is spread to cover area 3.

Within the scope of the present invention, cover 1 and leading edge 5 are slidably supported for reciprocatory traverses along the length of supports 11 in spaced relation over area 3 at a height, advantageously, greater than the maximum height reached by the plants growing in beds 3′. In the example of FIGURES 1 and 2, traveling cables 11 extend from one to the other end of area 3 in spaced relation to support cover 1 and, advantageously, also draw leading edge 5 in reciprocatory traverses back and forth along the length of area 3 to cover and uncover area 3 as hereinafter described. To furnish the necessary support for leading edge 5 and cover 1, cables 11 must be held in tension and the number of required cables is determined by the size and weight of cover 1 and leading edge 5. The tension in cables 11 can be adjusted by tightening drawing cables 11 where they are fastened to leading edge 5. If so desired, as in the example of FIGURE 1, fixed cables 11′ can be fastened between support rods 16 (hereinafter described) and 17 at opposite ends of area 3 to provide support to leading edge 5 and replace some of the traveling cables 11.

Within the scope of the present invention, leading edge 5 is moved back and forth over area 3 in reciprocatory traverses to cover and uncover area 3, as hereinbefore described, and in the example of FIGURES 1 and 2 leading edge 5 is moved in such reciprocatory traverses by traveling cables 11. In the example of FIGURES 1 and 2, the ends of each cable 11 are attached to leading edge 5 so each cable 11 forms an endless cable including leading edge 5. Each endless cable is suspended over area 3 in the form of an elongated loop extending the length of area 3 between pulleys 14 and shaft 4 as hereinafter described. Within each elongated loop one end of cable 11 is attached to leading edge 5, as hereinbefore described, and the cable extends to and around pulley 14 at one end of area 3 which reverses the cable and directs it back to shaft 4 at the opposite end area 3. As can be seen in the figures, the reversed portion of each cable 11 passes around pulley 14 at one end of area 3, is wrapped around shaft 4 at the other end of area 3, and is the lower side of the aforementioned elongated loop formed by each cable 11. A pulley 14 is provided for each traveling cable 11. Pulleys 14 are cooperatively spaced across the end of area 3 opposite shaft 4 and the spacing between pulleys 14 corresponds approximately to the spacing between cables 11. Pulleys 14 are fastened, for example by wires 27, to support 16 which extends the width of area 3 in spaced relation over the end of area 3 is held by supports 21 fixed to an adjoining structure or other suitable means.

Leading edge 5 is supported on the lower sides of the elongated loops formed by cables 11 while the upper sides of said loops are fastened to leading edge 5. Each of the cables 11 is wrapped around shaft 4 at the end of the elongated loops opposite pulleys 14 where shaft 4 extends the width of area 3 on the opposite side of support 17 from cover 1 and is rotatably mounted in bearings 6. Bearings 6 are fixed to supports 7 hereinbefore described. Within the scope of the present invention, and as shown in FIGURES 1 and 2, the portion of each cable 11 between shaft 4 and leading edge 5 in the upper side of the elongated loops extends, advantageously, beneath both cover 1 and support 17.

In the example of FIGURE 1, shaft 4 is turned by pulley 22 and belt 23 driven by motor 19 connected to a source of power 24.

In the example of FIGURES 1 and 2, as can best be seen in FIGURE 2, area 3 is uncovered by rotating shaft 4 in a clockwise direction. As shaft 4 is turned, the portion of each cable 11 between leading edge 5 and shaft 4 in the upper side of the elongated loop is drawn to shaft 4 to correspondingly draw leading edge 5 toward suport 17 to uncover area 3. In accordance with the example of the present invention as shown in FIGURES 1 and 2, leading edge 5 withdraws cover 1 from area 3 by pushing cover 1 along supports 11 and 11′ toward support 17 so the cover is collected between leading edge 5 and support 17 as leading edge 5 approaches suport 17. The lower side of leading edge 5 rests directly on, and is supported by, cables 11 in sliding relation to overcome any tendency of leading edge 5 to override cover 1 which would allow portions of cover 1 to slip under leading edge 5 and hinder the uniform withdrawal of cover 1 from area 3. Furthermore, in accordance with the present invention as shown in the example of FIGURES 1 and 2, the section of each cable 11 of the elongated loop between shaft 4 and leading edge 5 passes under support 17 and cover 1 to hold cover 1 above and away from the underside of leading edge 5 to prevent leading edge 5 from overriding cover 1 as it is withdrawn. Such an arrangement is particularly useful when the tension in one of the cover supports 11 or 11′ is reduced and the support sags away from leading edge 5 and cover 1 could slip under the leading edge if it were not restrained by cable 11.

To spread cover 1 over area 3, as shown in the example of FIGURES 1 and 2, shaft 4 is turned in a counterclockwise direction by means hereinbefore described to draw cable 11 from the lower side of each elongated loop toward shaft 4 and simultaneously unwind cable from shaft 4 to the section of the upper side of each loop between shaft 4 and leading edge 5. Accordingly, the section of cable between leading edge 5 and pulleys 14 in the upper side of each loop is correspondingly shortened to draw leading edge 5 toward pulleys 14. As leading edge 5 slides from support 17 toward pulleys 14, cover 1 is uniformly spread over area 3 and when leading edge 5 reaches pulleys 14, cover 1, advantageously, has been completely spread over area 3. Leading edge 5 also uniformly distributes the pulling force exerted on leading edge 5 over the length of edge 1′ of cover 1 to reduce the probability of tearing cover 1.

Figures 3, 4, 6:
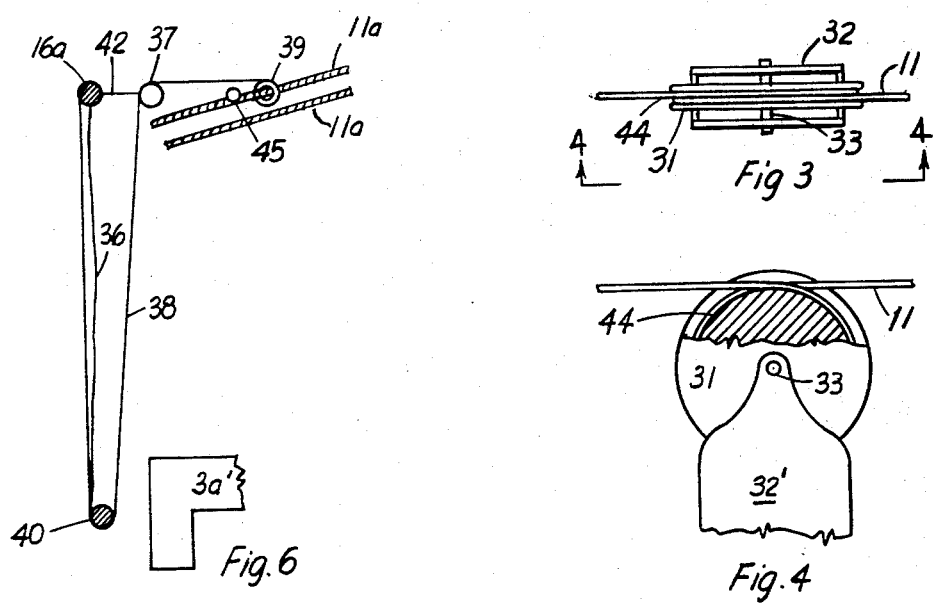
FIGURE 3 is an enlarged view taken along a line passing through line 3—3 of FIGURE 1.
FIGURE 4 is a view taken along a plane passing through line 4—4 of FIGURE 3.
FIGURE 6 is a view taken along a plane passing through line 6—6 of FIGURE 5.

Within the scope of the present invention, additional supports can be provided for cover supports 11 and 11' intermediate the ends of area 3. In the example of FIGURES 1, 3, and 4, supports 32 are spaced along the length of area 3 as desired under traveling cables 11 and are particularly useful, for example, when the apparatus of the present invention is used to cover extremely long areas, or when it is desirable to eliminate some of the support cables 11 or 11' and still provide sufficient support for cover 1 and leading edge 5. The supports 32 of the example of FIGURES 1, 3, and 4 can be used when cable 11 is suspended above area 3 in the form of an elongated loop and the lower side of the loop is continuous for the length of the area 3 to be covered. Furthermore, the supports 32 of the example of FIGURES 1, 3, and 4 can be used to guide traveling cables 11 along the length of area 3 without adversely affecting the traversing movement of leading edge 5 on cables 11 and 11'.

Supports 32 include a base part 32' which can be rigidly supported in any desired manner as by fastening to beds 3' or imbedding the base in the ground. Supports 32 include an idler 31 at the top of the support which is mounted for rotation about an axis 33. As shown in FIGURES 3 and 4, each idler 31 includes a cable track 44 which, advantagetously, is wide enough to accommodate a double width of cable 11 in side-by-side relation so that cable 11 can be wound once around pulley 31 and the cables will be retained in side-by-side relation in track 44. Supports 32 are spaced as desired intermediate the ends of area 3 and directly under cables 11 so the top of each pulley 31 is at the same height as cables 11. Cables 11 are wrapped around pulleys 31 to permit cables 11 to be wound and unwound at the top of pulleys 31. As cables 11 traverse the length of area 3 in response to the rotation of shaft 4 as hereinbefore described, pulleys 31 are rotated on their respective axes 33. As hereinbefore discussed, leading edge 5 rides freely on cables 11, so in traverseing the length of area 3, leading edge 5 slides over the rotating pulleys 31 and the covering operation is unaffected by the use of supports 32.

Figures 5, 7:
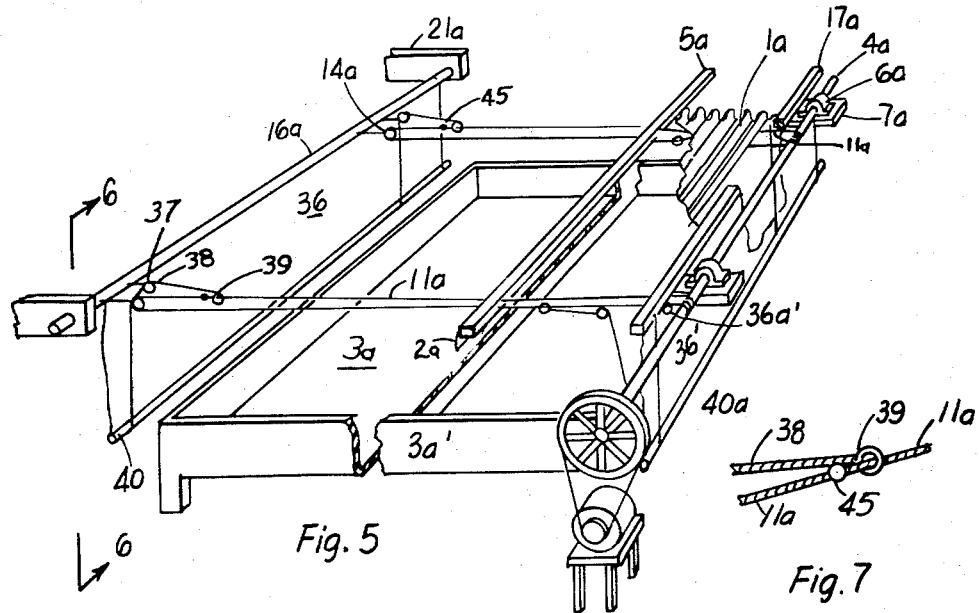
FIGURE 5 is an isometric view, partly in section, of an apparatus similar to FIGURE 1 and including end curtains for covering the top and four sides of an area of growing plants in accordance with the present invention with the top and ends being shown covered.
FIGURE 7 is an enlarged fragmentary view taken along a plane passing through line 7—7 of FIGURE 5.

The apparatus of the present invention can be used to spread a horizontal covering over an area, and within the scope of the present invention, curtains can be provided for the ends and sides of area 3. In the example of FIGURE 1, side curtains 2 depend from the sides of cover 1 to prevent admission of light to the sides of area 3. In one example of a means for providing end curtains to exclude light from the ends of an area, as shown in FIGURES 5, 6, and 7, end curtains 36 and 36' are provided and can be raised and lowered as cover 1a and leading edge 5a traverse the length of area 3 to cover and uncover the area. It is to be understood that for purposes of the present example, the apparatus of FIGURE 5 for providing horizontal covering over area 3a is similar to the apparatus of the example of FIGURE 1 for providing horizontal and side cover for an area 3. As described with respect to FIGURE 1, traveling cable 11a of FIGURE 5 moves leading edge 5a in traverses along the length of area 3a in response to rotation of shaft 4a to spread cover 1a over and withdraw cover 1a from area 3a.

In accordance with the example of FIGURES 5, 6, and 7, end curtains 36 and 36' are held over the ends of area 3a by fixing an upper edge of each curtain along the length of support bar 16a and 17a, respectively. Advantageously, leading edge 5 is drawn to adjacent light excluding relation with the uper edge of end curtain 36 when cover 1a is spread over area 3a. To improve the light excluding effectiveness of a closure formed between leading edge 5a and the upper edge of end curtain 36, a small curtain 2a can be attached to leading edge 5 and extend downward a selected distance as shown in FIGURE 5. At the other end of area 3, cover 36' is provided adjacent shaft 4a and includes an upper edge joined to support 17a along the width of area 3a to prevent admission of light to area 3a from that end. Curtain 36' includes apertures 36a' to admit cables 11a therethrough.

In accordance with the example of the present invention, curtains 36 and 36' are raised and lowered at selected times during the reciprocatory traverse of cover 1a over area 3a. In the example of FIGURE 5, curtains 36 and 36' are, advantageously, raised when cover 1 is withdrawn from area 3a and are lowered when cover 1a is spread over area 3a. The methods of raising and lowering curtains 36 and 36' is similar for both curtains and the operation of the apparatus for raising and lowering curtain 36 will be explained. Curtain 36 is held within the loop formed by a plurality of curtain cords 38. Cords 38 are fixed by one end to support bar 16a in selected spaced relation along the length of bar 16a, extend downward around the bottom of curtain 36 and upward through pulleys 37 to form the aforementioned loop, where pulleys 37 are held adjacent cables 11a on the side of curtain 36 closest to area 3. Pulleys 37 can be held in any desired position, for example, by wires 42 attached directly to suport 16a. To provide means for uniformly lifting and lowering curtains 36a and 36a', spindles 40 and 40a can be attached along the bottom edge of curtains 36 and 36a, respectively. It has been found that, as shown in FIGURES 5 and 6, curtains 36 and 36a will roll onto spindles 40 and 40a as the curtains area raised, or if the spindles are not provided, the curtains are gathered against supports 16a and 17a as they are raised.

Referring now to FIGURES 6 and 7, the second end of each curtain cord 38 is fastened to a ring 39 through which one of the adjacent traveling cables 11a passes freely. A suitable catch 45 is fastened to each cable 11a to catch the ring 39 through which the cable passes. Each catch 45, which can be a ball which is too large to pass through ring 39 but will pass through a pulley 37, is fixed to the cable 11a at a selected location to catch ring 39 at an advantageous point in the traverse of leading edge 5a over area 3a. When ring 39 is caught by catch 45, it thereafter moves with cable 11a, so curtain cord 38 is drawn through pulley 37 to decrease the size of the loop encircling curtain 36 and draw curtain 36 upward toward support 16a. In one advantageous example as in FIGURES 5, 6, and 7, catches 45 are disposed on cables 11a so curtains 36 and 36' are fully raised when cover 1a has been fully withdrawn from area 3a. It will be realized that as leading edge 5a traverses the length of area 3a in the opposite direction to spread cover 1a over area 3a, cables 11a, ring 39, and catches 45 move toward support 16a so cords 38 are fed back through pulleys 37 to increase the size of the loops encircling curtain 36 and curtain 36 is lowered. After cables 11a have moved a selected distance determined by the length of curtain 36 and the position of catches 45, catches 45 are disengaged from rings 39, curtain 36 has been fully lowered, and cable 11a once again passes freely through ring 39 until the direction of travel is reversed as cover 1 is withdrawn from area 3a.

The invention claimed is:

1. An apparatus for covering and uncovering a generally rectilinear shaped area of growing plants comprising: cover supporting means including a plurality of generally parallel cables in spaced relation above said area and extending from a first end to a second end of said area opposite said first end; a flexible sheet-like cover having a peripheral configuration similar to the periphery of said area to be covered slidably supported on said cover support means; edge attaching means to fixedly attach a first edge of said cover above and generally parallel to a first end of said area to be covered; stiff rod-like leading edge means attached along a second edge of said cover generally opposite said first edge, said leading edge being supported by and freely slidable on said support means to traverse said area from said first end to said second end of said area to spread said cover over and withdraw said cover from said area; at least one first traveling cable means joined to said leading edge means and extending, on the underside of said cover means, from said leading edge means to said first end of said area, and first motive means joined to said first traveling cable to draw said first traveling cable and said leading edge toward said first end of said area to remove said cover from over said area to be covered; and at least on second traveling cable means joined to said leading edge means and extending toward said second end of said area to be covered, and means joined to said second traveling cable means to move said second traveling cable and said leading edge toward said second end of said area to be covered to spread said cover over said area.

2. The apparatus of claim 1 and rotatable shaft means cooperatively mounted adjacent said edge attaching means with said first traveling cable means wrapped around said shaft means in nonslipping relation to draw said first traveling cable and said leading edge toward said shaft when said shaft is rotated in first direction and to unwind said first traveling cable from said shaft when said shaft is rotated in a second direction; pulley means cooperatively fixed adjacent said second end of said area to be covered wherein said second traveling cable means pass around said pulley means to reverse the direction of said second moving cable means and direct said reversed second cable means toward said rotatable shaft means; and means joining said reversed second cable means to said shaft means in nonslipping relation to wind said reversed second cable means on said shaft and move said leading edge toward said second end of said area to be covered when said shaft is rotated in said second direction and unwind said reversed second traveling cable from said shaft when said shaft is rotated in said first direction.

3. The apparatus of claim 2, including means joining said first cable means to said reversed second cable means to form an elongated loop extending in spaced relation over said area, wherein one end of said loop is passed around said rotatable shaft in nonslipping relation and a second end of said loop is passed around said pulley means so said loop is suspended between said shaft means and said pulley means and rotation of said shaft in either direction simultaneously winds cable means on and unwinds cable means from said shaft and rotation of said shaft in a first direction moves said leading edge on said support means toward said first end of said area and rotation of said shaft in said second direction moves said leading edge toward said second end of said area.

4. The apparatus of claim 3 wherein said reversed second cable means extend continuously from said pulley means to said rotatable shaft on the underside of said cover means and said leading edge.

5. The apparatus of claim 4 including cable support means disposed directly beneath said reversed second cable means intermediate the ends of said area to be covered to provide vertical support to said reversed second cable means.

6. The apparatus of claim 5 wherein said vertical supports include at least one rotatable pulley means intermediate the ends of said area to be covered mounted for rotation about an axis transverse the direction of said reversed second cable, said pulley means being disposed beneath said reversed second cable to receive at least one turn of said reversed second cable in wrapped relation so said reversed second cable is wound on, and unwound from, the top of said pulley means as said reversed second cable means traverses the length of said area to be covered.

7. The apparatus of claim 1 including side curtains depending from the sides of said cover and cooperative end curtains comprising: flexible end curtain means including an upper edge held ajacent said cover support means parallel an end of said area to be covered and extending the width of said area and downward from said cover support means; end curtain drawing means including curtain cord means fixedly attached adjacent said upper edge of said end curtain means on one side of said curtain and looping around the bottom edge of said curtain and upward toward said upper edge to hold said curtain in looped relation; ring means with said traveling cable passing therethrough and means joining the second end of said curtain cord means to said ring means; and catch means cooperatively joined to said traveling cable means to catch said ring means at selected point as said traveling cable moves over said area in a first direction and pull said curtain cord with said traveling cable to reduce the size of said loop holding said end curtain means and raise said curtain as said cover is withdrawn from said area to be covered and to release said curtain cord to lower said curtain as said traveling cable moves over said area in a second direction.

References Cited

UNITED STATES PATENTS

| 711,225 | 10/1902 | Putnam et al. | 47—28 |
| 3,294,150 | 12/1966 | Thomas | 47—17 XR |

FOREIGN PATENTS

| 173,559 | 7/1906 | Germany. |
| 470,457 | 1/1929 | Germany. |
| 565,280 | 11/1932 | Germany. |

ROBERT E. BAGWILL, *Primary Examiner.*

U.S. Cl. X.R.

160—84